INVENTOR.
SPYROS G. VARSOS

INVENTOR.
SPYROS G. VARSOS

May 28, 1968          S. G. VARSOS          3,386,081
PULSE SAMPLING AND COMPARISON SYSTEM SUITABLE
FOR USE WITH P.P.M. SIGNALS
Filed Feb. 28, 1964          6 Sheets-Sheet 4

INVENTOR.
SPYROS G. VARSOS
BY Michael A. Silex
Attorney

May 28, 1968

S. G. VARSOS 3,386,081

PULSE SAMPLING AND COMPARISON SYSTEM SUITABLE
FOR USE WITH P.P.M. SIGNALS

Filed Feb. 28, 1964

INVENTOR.
SPYROS G. VARSOS

BY Michael A. Sileo
ATTORNEY

3,386,081
PULSE SAMPLING AND COMPARISON SYSTEM SUITABLE FOR USE WITH P.P.M. SIGNALS
Spyros G. Varsos, Orange County, Fla., assignor to Martin-Marietta Corporation, Baltimore, Md., a corporation of Maryland
Filed Feb. 28, 1964, Ser. No. 348,210
13 Claims. (Cl. 340—172)

ABSTRACT OF THE DISCLOSURE

My invention relates to a pulse selecting technique for use with a pulse position modulated communication device, in accordance with which technique, a selection is made from a plurality of pulses that may occur in a time frame, that pulse which is closest to the position of the pulse selected as the intelligence pulse during the preceding time frame.

---

Figure 1:
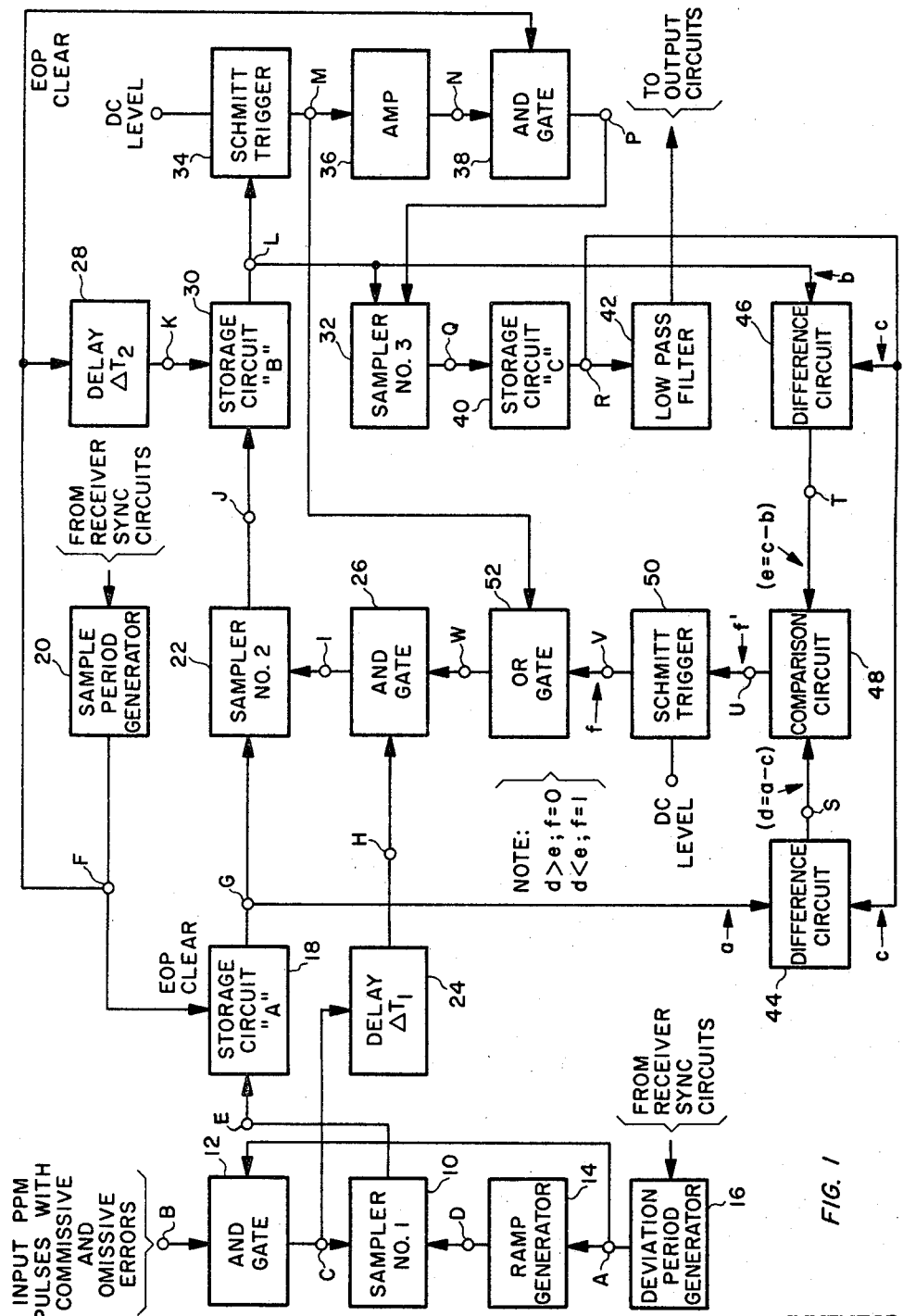

This invention relates to a pulse selecting system for demodulating pulse position modulated signals in which both commissive and omissive errors may exist, and more particularly to a system for demodulating a position modulated pulse train in which both intelligence and noise pulses of equal amplitude may appear, my system being advantageously capable of a high quality performance by virtue of a novel technique for selecting as the intelligence pulse during any one sample period, that pulse which is closest in position to the position of the pulse selected during the previous sample period.

In many of the most recently developed commercial and military communication systems, pulse techniques for voice transmission are employed. Pulse type communication systems which transmit modulated pulses are often preferable in lieu of the many well known amplitude or frequency modulated carrier wave communication systems since they (1) require considerably less transmitter power, (2) are easily adaptable to handle digital data, and (3) provide plural message transmission with frequency-time sharing yet require a relatively narrow bandwidth with respect to the number of messages sharing the frequency spectrum. Insofar as military communication systems are concerned, pulse modulation techniques are highly desirable since they are easily adaptable to encryption for security purposes.

One well known pulse type communication system utilizes the position of a pulse within definable time periods as the modulation technique. This type of modulation is commonly called pulse position modulation (PPM) and is attractive in that it has a considerably small line pulse rate or pulse density. Basically, in PPM systems, a varying signal, such as an audio signal, is periodically sampled and the voltage value of the varying signal during each periodic sample is caused to vary the time position of a pulse within a finite time period. For purposes herein, the rate in which the varying signal is sampled shall be referred to as the sample frequency; the time between samples shall be referred to as the sample period; and the finite time period in which a pulse is positioned relative to the voltage value of the varying signal during instantaneous sampling shall be referred to as the deviation period, which conventionally is equal to or less than the sample period.

In PPM type communication systems, by appropriately synchronizing the transmitter and the receiver, any pulse received during the deviation period is detected and accepted for decoding or demodulating, whereas any pulse received outside the deviation period is disregarded or rejected. Clearly by narrowing the deviation period with respect to the sample period, noise rejection may be greatly improved. However, other circuit parameters and requirements establish minimum limits upon the deviation period. By way of example, in a PPM communication system having a 9.6 kc. sampling frequency and a 104 microsecond sample period, the minimum allowable deviation period has been determined to be 35 microseconds. Under these conditions, the receiver will reject all pulses, which advantageously includes noise pulses, occurring during approximately two-thirds of the sample period, while any pulse of proper width and amplitude will be detected and accepted for decoding during the remaining one-third of the sample period.

Under ideal conditions only one pulse will be present as the intelligence pulse during any one deviation period. However, practical experience shows that ideal conditions do not occur as frequently as would be necessary to provide high quality reproduction of the intelligence transmitted, and some noise pulses are invariably involved.

There are primarily three undesirable conditions which degrade the quality of voice reproduction due to either the selection of the wrong pulse as the intelligence pulse by the receivers decoding circuits or due to the absence of a pulse during any sample period. First, there is the "omissive error" condition wherein no pulses, not even noise pulses, occur during the deviation period of the sample period; second, there is the "commissive error" condition wherein more than one pulse occurs during such deviation period; and third, there is the "omissive-commissive error" condition wherein the intelligence pulse is not present but interference pulses of sufficient width and amplitude are present during such deviation period.

In most prior known PPM communication systems, little consideration was given to the foregoing three undesirable conditions except to reduce the deviation period to a minimum. Although a very narrow deviation period considerably eliminates interference problems and greatly improves intelligence pulse selection, interference pulses (commissive errors) still occur during the narrow deviation period, and intelligence pulses are still lost (omissive errors) between modulation at the transmitter and demodulation at the receiver.

Although the prior art is replete with noise reduction circuits, few of these circuits are applicable for use in PPM systems. One known noise reduction circuit which however is applicable for use in PPM systems utilizes a sine-wave generator for varying the sensitivity of the PPM receiver so that its sensitivity will be normal during the deviation period but considerably reduced during time periods outside of the deviation period. This type of circuit arrangement is useful to prevent some of the interference signals from passing to the audio circuits of the system, but it does not provide adequate omissive or commissive error reduction.

The present invention is therefore primarily directed toward a novel technique for adequately reducing the effects of omissive or commissive errors. Basically, this novel technique advantageously utilizes memory and logic circuits to decide what voltage information should be coupled to the output circuits of the PPM receiver.

In accordance with the present invention all pulses received during any one time frame are gated to a PPM detector which converts each of these PPM pulses into pulse amplitude modulated (PAM) pulses. The first and second PAM pulses received during that time frame are respectively stored in first and second memory circuits. The voltage level of the first and second pulses are then independently compared with the voltage level of the pulse selected during the previous time frame, which voltage level is stored in a third memory circuit. If the voltage level of the first pulse received during any one time frame is closer to the voltage level of the pulse selected during the previous time frame than is the voltage level of the second pulse received during the same time frame, the first memory circuit remains unchanged, however, if the second pulse receiver during that one time frame is closer in voltage level to the voltage level of the pulse selected during the previous time frame than is the voltage level of the first pulse received during the same time frame, the first memory circuit is charged to the voltage level of the second pulse received. All subsequent pulses received during that one time frame are similarly compared with the voltage level of the pulse selected during the previous time frame with respect to the voltage level stored in the first memory circuit. At the end of this particular time frame, the third memory circuit is caused to be charged to the voltage level stored on the first memory circuit, and this voltage level is appropriately coupled to the output circuits of the PPM receiver, thus to utilize as the intelligence pulse, a pulse having a high probability of being the correct pulse.

Note here, that the first and second memory circuits of this invention may be preferably discharged at the end of each time frame if so desired for clearing the logic circuits and preparing the pulse selector for the next time frame. However, a circuit clear or voltage "dump" feature is not absolutely necessary, since all the memory circuits may be conveniently designed to charge or discharge to the voltage level of whatever pulse is applied to its input circuit. It is merely necessary, therefore, to provide gating circuits for routing the received pulses to the appropriate first and second memory circuits for proper comparison with the voltage stored in the third memory circuit.

It is accordingly one object of the present invention to provide a novel pulse selecting system.

Another object of the present invention is to provide a novel pulse position demodulator.

Another object of the present invention is to provide a pulse selecting system which is capable of receiving a plurality of pulses during any one sample period and to select as the intelligence pulse one of the pulses received in preference to all other pulses.

Another object of the present invention is to provide a pulse selecting system which is capable of receiving both position modulated pulses and randomly occurring noise pulses in spaced time frames and accurately select any one of the pulses occurring during any one of the time frames in preference to any other other pulse occurring during the same time frame.

Another object of the present invention is to provide a pulse selecting system capable of receiving position modulated pulses and randomly occurring noise pulses in spaced time frames and accurately selecting from the plurality of pulses occurring during any one of the time frames, the pulse which is closest in amplitude to the amplitude of the pulse selected during the previous time frame.

Another object of the present invention is to provide a pulse selecting system capable of receiving position modulated signal pulses and randomly occurring noise pulses in spaced time frames and accurately selecting from the plurality of pulses occurring during any one of the time frames, the pulse which is closest in position to the position of the pulse selected during the previous time frame.

Another object of the present invention is to provide a pulse selecting system which is capable of receiving position modulated pulses and randomly occurring interference signals of equal amplitude in spaced time frames, which system utilizes memory circuits for storing during any one time frame only one of the pulses received, and logic circuits for sequentially comparing this stored pulse with each pulse received during the next time frame, whereby the pulse occurring during such subsequent time frame which is closest in position to the position of the stored pulse is uniquely selected and utilized as the intelligence pulse.

Figure 2:
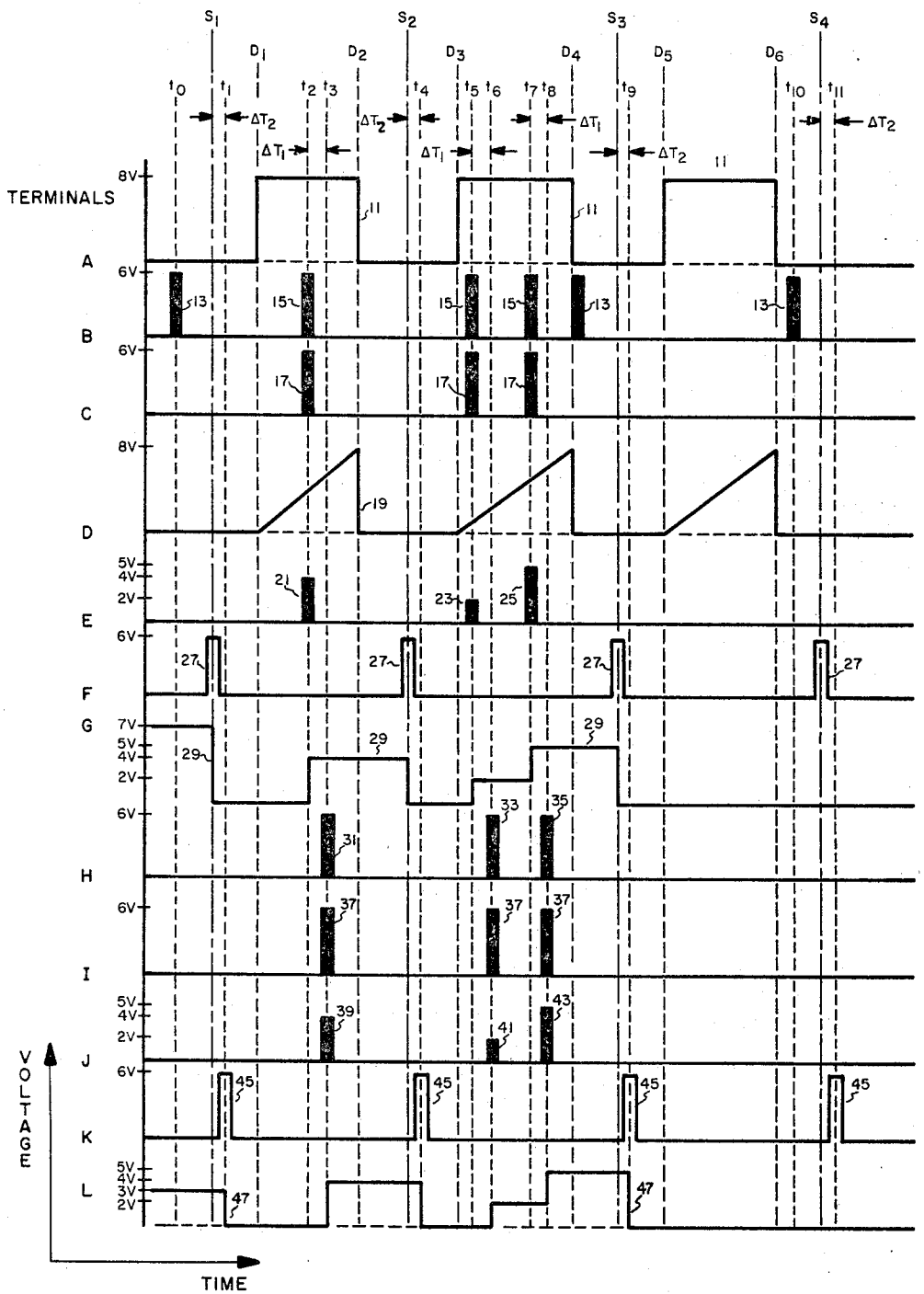
Figure 3:
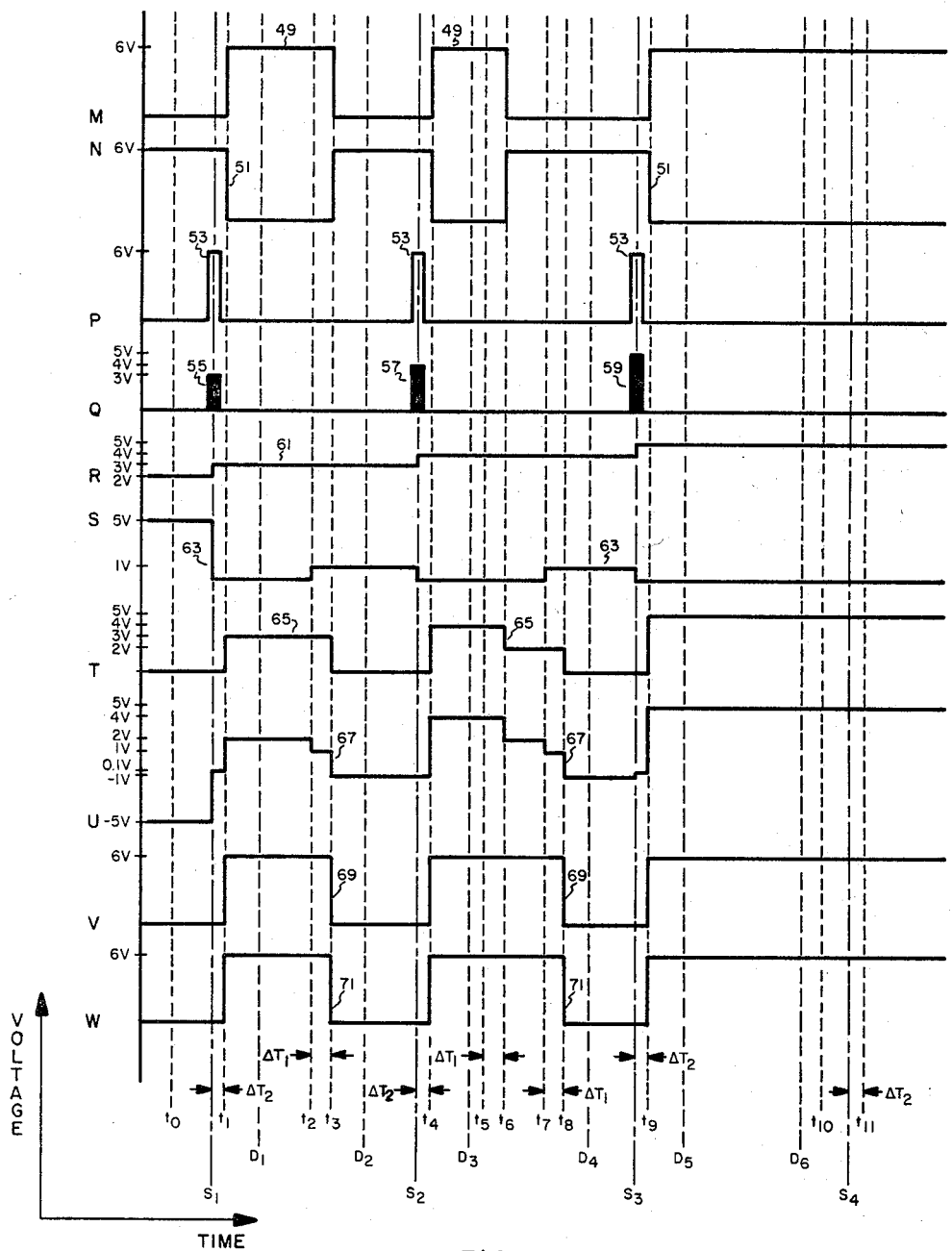

These and further objects and advantages of the present invention will become more apparent upon reference to the following description and claims and the appended drawings wherein:

FIGURE 1 is a block diagram of a preferred embodiment of the pulse selecting system in accordance with the present invention. The inputs to this circuit are PPM pulses developed by the PPM receiver antenna circuits, and synchronizing signals developed by the PPM receiver sync circuits;

FIGURES 2 and 3 depict waveforms present at several appropriate terminals in the block diagram of FIG. 1. The vertical dashed lines of these figures represent pertinent time periods and are included to assist in the detailed explanation of the circuit of FIG. 1 and its mode of operation. Note that the bottom of FIG. 2 coincides from left to right with the top of FIG. 3.

FIGURES 4–8 respectively exemplify a ramp generator, a sampler, a storage circuit, a difference circuit and a comparison circuit which may be utilized in the block diagram of FIG. 1.

Figure 9:
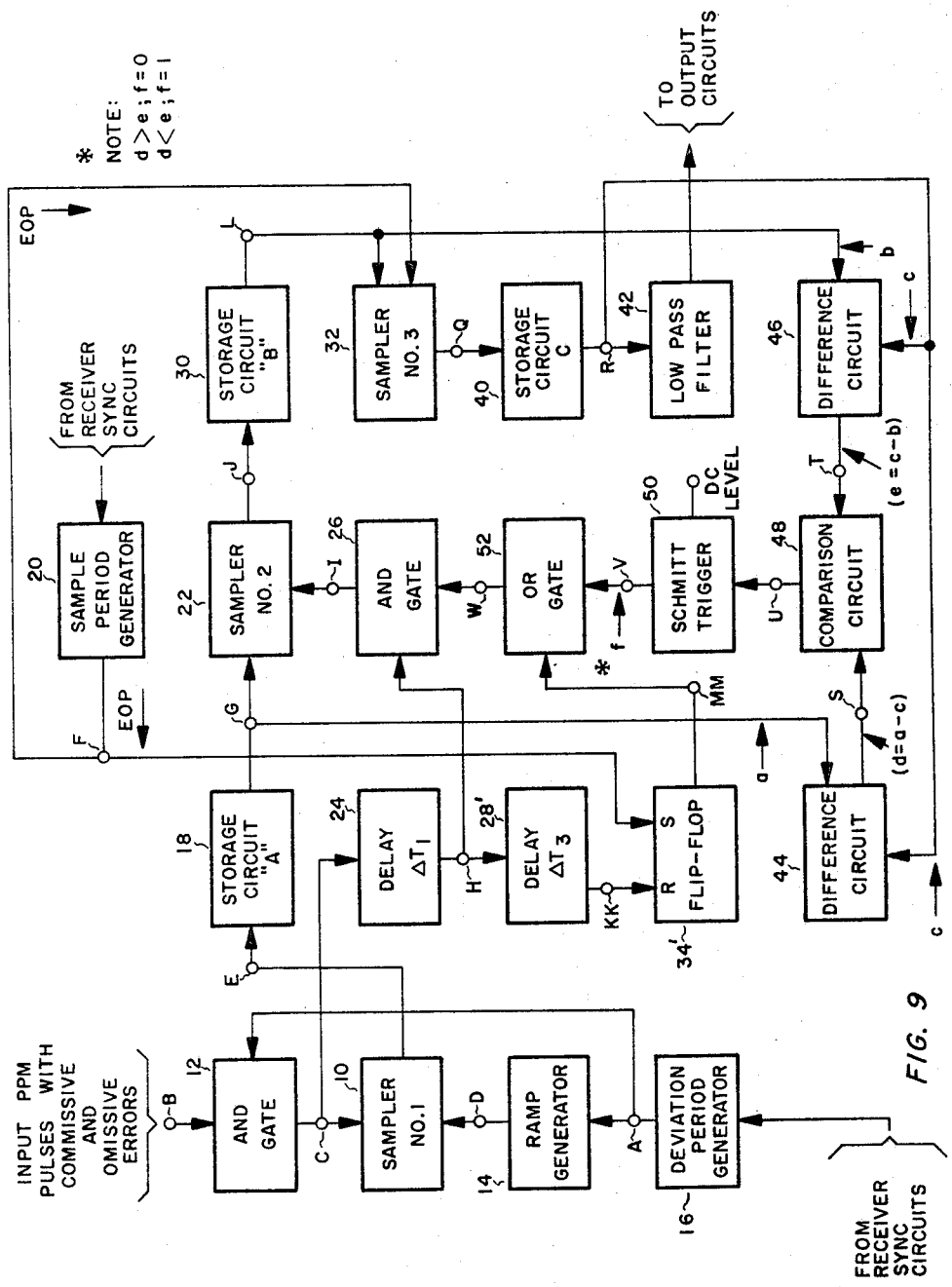

FIGURE 9 is a block diagram of an alternate embodiment of the pulse selecting system of the present invention.

While the present invention is directed to a pulse selecting system having general applicability, it is primarily applicable to a co-channel pulse type communication system of the person-to-person type. Systems of this type may involve a large group of basic subscriber units having intermittent requirements for communication between other pairs of basic subscriber units and such systems utilize conventional telephone equipment without utilization of well known wire communication links or central telephone exchanges.

The transmitter and receiver combinations used by each basic subscriber of this type of co-channel system may conventionally operate upon the same three frequencies, such as 140, 141 and 142 megacycles. Each subscriber's voice is preferably sampled at a sample frequency of approximately 8,000 samples per second so as to obtain a sufficient number of amplitude samples. The sampled voice signals are then converted by conventional pulse modulating techniques to a series of pulses whose positions contain the intelligence to be transmitted. The sampling frequency dictates the sample period or time frame which may be, for example, 125 microseconds long, with the position of the pulse within the deviation period representing the intelligence to be transmitted. The pulse width of the intelligence pulses to be transmitted may be, for example, 1–20 microseconds wide; whereas the deviation period may be, for example 50 microseconds long.

In accordance with a co-channel communication system of the aforementioned type, each position modulated pulse is converted into three pulses by delay line techniques. The three pulses are then coded, as a result of a user's manipulation of the delay lines on the transmitter portion of his basic subscriber unit, into a pulse assembly that will be recognized only by the user of the basic subscriber unit being called. Each receiver portion of each basic subscriber unit is correspondingly equipped with delay lines which result in that basic subscriber unit being capable of receiving only those pulse combinations intended for that unit. There is by necessity in communication systems of this type and advantageous amount of time sharing of the frequency spectrum. The utilization of relatively narrow pulses requires the communication system to employ considerably broad band techniques.

Since there are a large number of pulse combinations on the three basic frequencies, a large number of simultaneous conversations between basic subscriber units within the same geographical area may take place. The number of simultaneous conversations may be increased until the pulse density becomes so great as to result in unwanted crosstalk representing interference between conversing pairs of basic subscriber units. It is toward the reduction of the undesirable effects of crosstalk and other interference conditions that the present invention is directed. For a more detailed description of the aforementioned co-channel pulse type communication system, reference may be made to the McKay Goode application Ser. No. 107,194, filed May 2, 1961, now Patent No. 3,239,761 entitled Discrete Address Communication System With Random Access Capability.

For purposes of simplicity and clarity the pulse selecting system described hereinafter includes merely circuits sufficient to compare only the pulses appearing during any one time frame with the pulse selected during the immediately previous time frame. It is to be understood of course that additional memory circuits and corresponding comparison and decision circuits may be incorporated into the pulse selecting system of FIG. 1 for the purpose of comparing pulses occurring during any one time frame with the pulse selected during time frames prior to the immediately previous time frame without departing from the spirit and scope of the present invention. This additional comparison capability permits the pulse selection system of the present invention to provide mathematical probability into the pulse selection function whereby the pulse during any one time frame which is closest to the average change in position of the pulses selected during several previous time frames may be selected. That is to say, in normal speech the change in the voltage level of the audio intelligence during adjacent samples of say approximately 8,000 kc. per second is generally small, and when the audio intelligence is rising, for example, it is most probable that the voltage level of the next sample will rise an amount equal to the voltage change of the audio intelligence during several previous samples. Accordingly, comparison of the voltage level of each of a plurality of pulses received during any one time frame with the voltage level of several previously selected pulses will increase the accuracy of the pulse selecting system from a mathematical probability viewpoint when either commissive or imissive errors or both exist.

*Detailed description—FIGURES 1–3*

FIGURE 1 sets forth a block diagram of a preferred embodiment of a pulse selecting system in accordance with the present invention, whereas FIGS. 2–3 depict several waveforms present at certain selected terminals of the block diagram of FIG. 1, and are included to assist in describing the block diagram of FIG. 1 and its mode of operation.

Note here that in FIGS. 2–3, the ordinate represents voltage units while the abscissa represents units of time, and that vertically extending dashed lines are included for representing three exemplary sample periods, $S_1$–$S_2$, $S_2$–$S_3$ and $S_3$–$S_4$; three exemplary deviation periods, $D_1$–$D_2$, $D_3$–$D_4$ and $D_5$–$D_6$; and several pertinent finite times $t_0$–$t_{11}$. Note also that the deviation periods $D_1$–$D_2$, $D_3$–$D_4$ and $D_5$–$D_6$ have a time duration less than the time of their respective sample periods. The purpose for providing a deviation period reasonably narrow with respect to the sample period is to reduce the undesirable effect of interference pulses which may occur during the beginning and end portions of the sample periods.

For purposes of this description, it will be assumed that conventional well known pulse position modulation techniques are utilized by the PPM transmitter (not shown), and that appropriate synchronization between the transmitter and receiver is provided. Insofar as synchronization is concerned, if an external synchronizing technique is utilized, the transmitted sync signal will be detected by the receiver's sync circuits appropriately coupled to control the deviation period generator 16 and sample period generator 20, as shown in FIG. 1. If, however, an internal or self synchronizing technique is utilized, an internal control voltage will be developed by the receiver's sync circuits and used to control an internal clock generator. It is the output of the clock generator which is appropriately coupled to control the deviation period generator 16 and sample period generator 20. A more detailed description of a self-synchronous technique is disclosed in the co-pending application of Laurence H. Graham, Ser. No. 235,315, filed Nov. 5, 1962, now Patent No. 3,166,712, entitled Balanced Output Demodulator for Pulse Position Demodulation, which patent is assigned to the assignee of the present invention.

Referring first to the left-hand portion of FIG. 1, the No. 1 Sampler 10, AND Gate 12, Ramp Generator 14 and Deviation Period Generator 16 basically perform the function of demodulating any input PPM pulses applied to terminal B.

Sampler 10 is of conventional design in that it has a capability of developing an output voltage, such as pulses 21, 23 and 25 of FIG. 2, at its output terminal E, which are equal in amplitude to the voltage, such as sawtooth wave 19 of FIG. 2, which are applied to its one input terminal D, such as waveform 19 of FIG. 2, during the time period in which signals, such as pulses 17 of FIG. 2, are applied to its other input terminal C. A description of a preferred sampler circuit is set forth below with regard to the detailed description of FIG. 5.

AND Gate 12 is also of conventional design with an ability to produce positive output voltages, such as pulses 17 of FIG. 2, when positive voltages, such as square wave 11 and PPM pulses 13 and 15 of FIG. 2, are above a predetermined voltage level and are simultaneously applied to its two input terminals A and B. Since gating circuits of this type are commonly known to skilled circuit designers, an exemplary circuit is not included herein.

Ramp generator 14 is also of conventional design in that it provides a linearly rising voltage, such as sawtooth wave 19 of FIG. 2, at its output terminal D upon application of trigger voltages, such as square wave 11 of FIG. 2, on its input terminal A. A ramp generator of this type is preferable since it is capable of accurately developing linear sawtooth pulse trains. A description of a preferred ramp generator circuit is set forth below with regard to the detailed description of FIG. 4.

Deviation period generator 16 is also of well known design in that it has a capability of providing a squarewave, such as squarewave 11 of FIG. 2, at its output terminal A which has leading and trailing edges in respective time coincidence with the beginning and end of the deviation periods of the system.

In the exemplary block diagram of FIG. 1, the pulse width of each of the pulses of waveform 11 is by design equal to a predetermined deviation period, such as $D_1$–$D_2$ of FIG. 2, and are utilized to control the operation of AND gate 12 and ramp generator 14 in time coincidence with the deviation periods $D_1$–$D_2$, $D_3$–$D_4$ and $D_5$–$D_6$.

The output of generator 16, which appears at terminal A, is accordingly coupled to both AND gate 12 and ramp generator 14, whereupon the leading and trailing edges of squarewave 11 control the width of the sawtooth pulses of waveform 19, which waveform is developed by Ramp Generator 14; while the positive portion of square wave 11 enables or opens the AND gate 12 during the equal deviation periods $D_1$–$D_2$, $D_3$–$D_4$ and $D_5$–$D_6$. Thus, any PPM pulses present on input terminal B of AND gate 12 during the time duration of the positive portion of squarewave 11, will be appropriately gated to the No. 1 sampler 10.

Demodulation or conversion of the PPM pulses, such as pulses 15, which are gated through to the sample 10, into pulse amplitude modulated pulses (PAM), such as pulses 21, 23 and 25, is achieved by sampling the voltage of the sawtooth wave 19 during the periods in which the gated PPM pulses 17 are present on terminal C. That is to say, the voltage level of sawtooth wave 19 that is present on terminal D when a PPM pulse 17 is present on terminal C will be coupled to terminal E and appropriately stored in storage circuit 18. The relative time relationships between squarewave 11, sawtooth wave 19, PPM pulses 13 and 15, gated PPM pulses 17, and PAM pulses 21, 23 and 25 are graphically represented in the upper-half of FIG. 2.

It will be apparent at this point that sampler 10, AND gate 12, ramp generator 14 and deviation period generator 16 in combination convert the position of any PPM pulse present on terminal B during the equal deviation periods $D_1$–$D_2$, $D_3$–$D_4$ and $D_5$–$D_6$ into amplitude modulated pulses (PAM). Accordingly, the time position of gated pulses 17 establish what voltage level of sawtooth wave 19 will be coupled to storage circuit 18. Note in FIG. 2, for example, the intercept of the time lines $t_2$, $t_5$ and $t_7$ and the sawtooth wave 19.

PAM pulses 21, 23 and 25 are then coupled via terminal E to storage circuit 18 and stored therein. Storage circuit 18 is of conventional design with a capability of accurately storing voltages, such as pulses 21, 23, and 25, which are applied to its input terminal E, and yet produce at its output terminal G a voltage equal to the voltage it is storing. Storage circuit 18 should also be capable of dynamically changing the voltage it is storing without requiring the application of storage "clear" or discharge signals. Accordingly, storage circuit 18 may be a conventional capacitor storage circuit, and yet meet the foregoing storage requirements. Note here that the output of storage circuit 18 appears at terminal G, e.g. waveform 29 in FIG. 2, and is coupled to both the No. 2 sampler 22, which is similar in all respects to samples 10, and to the difference circuit 44. A description of a preferred storage circuit is set forth below with regard to the detailed description of FIG. 6; whereas a description of a preferred difference circuit is set forth below with regard to the detailed description of FIG. 7.

Referring again to terminal C, the gated PPM pulses 17 are also coupled to the delay 24 which delays these pulses a predetermined finite interval $\Delta T_1$, as graphically represented in FIG. 2 as pulses 31, 33 and 35. Delayed pulses 31, 33 and 35 are coupled to one input of the AND gate 26 via terminal H. AND gate 26 is a conventionally designed gate similar in all respects to AND gate 12. Accordingly, whenever positive voltages above a threshold value are simultaneously present on terminals H and W, which are the two input terminals of AND gate 26, a positive voltage will be present on output terminal I, as graphically represented in FIG. 2 as pulses 37. Note here that the voltage stored in storage circuit 18 cannot be sampled by sampler 22 and stored in storage circuit 30 unless positive gating pulses such as pulses 37, are present on output terminal I of AND gate 26. Note also that the delay $\Delta T_1$ must be long enough to permit the gated PPM pulses 17 to be converted into PAM pulses and stored in storage circuit 18 before any sampling of the voltage stored in storage circuit 18 takes place.

For the moment let it be assumed that a positive voltage is present on terminal W and accordingly enabling or opening AND gate 26. When delayed pulses 31, 33 and 35 are sequentially present on terminal H positive pulses having time durations equal to the time durations of delayed pulses 31, 33 and 35 will be present on terminal I and appropriately utilized to provide sample times for the No. 2 samples 22. Examples of such delayed pulses are graphically represented in FIG. 2 as pulses 37. Since sampler 22 is similar in all respects to sampler 10, whenever positive pulses, such as pulses 37, are present at terminal I, the voltage present on terminal G, such as waveform 29, will appear at output terminal J and appropriately stored in storage circuit 30, which storage circuit is similar in all respects to storage circuit 18. That is to say, the sampler 22 will sample whatever voltage is stored in storage circuit 18, i.e., waveform G, during the time duration of the pulses 31, 33 and 35, which AND gate 26 couples to terminal I, and such sampled voltages, i.e., pulses 39, 41 and 43, will be coupled to terminal J. Accordingly, pulses 39, 41 and 43 will be coupled to and stored in storage circuit 30.

The voltages applied to storage circuit 30 are graphically represented in FIG. 2 as pulses 39, 41 and 43 and appear on terminal J; whereas, the voltage stored in storage circuit 30 is graphically represented in FIG. 2 as waveform 47, which appears on terminal L. The output of storage circuit 30, i.e. waveform 47, is simultaneously coupled to the No. 3 sampler 32, Schmitt trigger 34 and difference circuit 46.

Referring first to the Schmitt trigger 34, when waveform 47 is lower than the DC level applied to the other input of Schmitt trigger 34, the output thereof, which appears at terminal M, will be high, such as 6 volts as shown in waveform 49 of FIG. 3; whereas, when the waveform 47 is higher than the DC level applied to the Schmitt trigger 34, the output at terminal M will be low, such as 0 volts as also shown in waveform 49 of FIG. 3. The output of the Schmitt trigger 34, i.e., waveform 49, is appropriately coupled to the OR gate 52.

It should be noted here that when the first PPM pulse is received by the pulse selector of the present invention during the first deviation period $D_1$–$D_2$ the voltage stored in storage circuit 30 will be zero or some negative value. Schmitt trigger 34 is therefore designed so that a positive voltage will appear at its output terminal M when the voltage at the output terminal L of storage circuit 30 is zero volts or lower. When terminal M is high, such as shown at time $t_1$ in FIG. 3, the voltage at the output terminal W of OR gate 52 will also be high since the OR gate 52 will be opened thereby passing such positive voltage. Thus, when there is no voltage stored in storage circuit 30, such as time $t_2$, Schmitt trigger 34 senses this condition, opens OR gate 52, which in turn directly enables AND gate 26, and causes the voltage at terminal G to be sampled by sampler 22 during the time duration of the first pulse 37. This sensing action of Schmitt trigger 34 provides the desirable feature of always storing in storage circuit 30 whatever voltage is stored in stirage circuit 18 when the storage circuit 30 is discharged. Of course, when the output terminal L of storage circuit 30 is above zero voltage, the Schmitt trigger 34 will also sense this condition and develop a low potential, such as 0 volt, and apply this low potential to OR gate 52, such as shown in waveform 49 at time $t_3$, $t_6$, $t_8$, etc., and consequently not open the OR gate 52.

Referring again to the output terminal L of storage circuit 30, the voltage appearing thereon is also coupled simultaneously to the difference circuit 46, which is conventionally designed in that this circuit develops an output voltage, such as waveform 65 of FIG. 3, which is equal to the difference between the voltages applied to its two inputs. A description of an exemplary difference circuit is set forth below regarding the detailed description of FIG. 7.

It will be recalled at this point that one of the objects of the present invention is to decide which pulse of a plurality of pulses received during any sample period is to be utilized as the intelligence pulse. As stated earlier, since it is mathematically most probable that the pulse of a plurality of pulses received during any one time frame which is positioned closest to the position of the pulse selected during the immediately previous time frame is the desired intelligence pulse, the present invention must provide means for determining which of said plurality of pulses is closest in position to the position of the previously selected pulse.

The circuit for performing this necessary pulse selection includes difference circuits 44 and 46, comparison circuit 48 and Schmitt trigger 50, which circuits are uniquely arranged to independently compare the voltage levels stored in the storage circuits 18 and 30 with the voltage level stored in storage circuit 40. Since a detailed description of the mode of operation of the circuit of FIG. 1 is set forth below, it will suffice to state here that the voltages stored in storage circuit 18 and 30 respectively represent the voltage levels of two pulses received during any given time frame, such as pulses 23 and 25 of FIG. 2, whereas, the voltage level stored in storage circuit 40 represents the voltage level of the pulse selected during the immediately previous time frame. Pulse selection is advantageously achieved by coupling one of the inputs of difference circuits 44 and 46 to terminals G and L, respectively, while the other input of these difference circuits are each coupled to terminal R, whereby the voltages applied to these difference circuits are independently compared. For example, difference circuit 44 subtracts the voltage level at terminal R (waveform 61) from the voltage level at terminal G (waveform 29); whereas difference circuit 46 subtracts the voltage level at terminal L (waveform 47) from the voltage level at terminal R (waveform 61). That is to say, letting waveform 29 be referred to as $(a)$ and waveform 61 referred to as $(c)$, then the output of the difference circuit 44, which will be present at terminal S, will be $[d=a-c]$; whereas, letting waveform 47 be referred to as $(b)$ and again referring to waveform 61 as $(c)$ than the output of the difference circuit 46, which will appear on terminal T, will be $[e=c-b]$. The difference voltages $(d)$ and $(e)$, which respectively appear on terminal S and T, are graphically represented in FIG. 3, as waveforms 63 and 65, respectively. Difference voltages $(d)$ and $(e)$ are then compared in the comparison circuit 48.

Comparison circuit 48 is of conventional design in that it develops a voltage, such as waveform 67, relative to the voltage levels of the two difference signals $(d)$ and $(e)$ which are applied to its two inputs. The comparison of difference signals $(d)$ and $(e)$ is graphically represented in FIG. 3 as waveform 67, which waveform is present on terminal U and appropriately coupled to the Schmitt trigger 50. Letting the output of comparison circuit 48 be referred to as $(f)$, when difference voltage $(d)$ is greater than difference voltage $(e)$, voltage $(f)$ will be low; whereas when difference voltage $(d)$ is less than difference voltage $(e)$, voltage $(f)$ will be high.

Note here that when the output of comparison circuit 48 exceeds a threshold level established by the DC level applied to the Schmitt trigger 50, trigger 50 is driven to one of its stable states, and correspondingly when the output of comparison circuit 48 falls below the DC level applied to the Schmitt trigger 50 it is driven into its other stable state. The output of Schmitt trigger 50 is graphically represented in FIG. 3 as waveform 69 which is present on terminal V. Thus, when voltage $(f)$ is high, voltage $(f')$ will also be high, such as shown in waveform 69 at time $t_1$; whereas, when voltage $(f)$ is low, voltage $(f')$ will also be low, such as shown in waveform 69 at time $t_3$.

For the sake of discussion, the low voltage level of Schmitt trigger 50 will be referred to as its ZERO state, and the high voltage level of Schmitt trigger 50 as its ONE state. Thus, when trigger 50 is in its ZERO state the voltage stored in storage circuit 18 will not be sampled nor stored in storage circuit 30 since OR gate 52 will not be opened and AND gate 26 correspondingly not enabled. When trigger 50 is in its ONE state, however, the OR gate 52 will be opened and consequently AND gate 26 will be enabled, thereby causing the voltage stored in the storage circuit 18 to be sampled and appropriately stored in storage circuit 30.

Note here that Schmitt trigger 50 will be in its ONE state whenever the voltage stored in storage circuit 18 is closer to the voltage stored in storage circuit 40 than is the voltage stored in storage circuit 30. This latter condition will exist whenever more than one PPM pulse occurs during the deviation period of any one sample period and the position of the latter PPM pulse of any two adjacent PPM pulses is closer to the position of the PPM pulse selected during the immediately previous sample period.

Referring now to the sample period generator 30, synchronizing pulses from the PPM receiver sync circuits (not shown) are applied to the input of generator 30 and cause generator 30 to develop time spaced pulses, such as pulses 27 of FIG. 2. Pulses 27 are commonly referred to as end-of-period (EOP) pulses. EOP pulses 27 are simultaneously coupled to the storage circuit 18, delay 26 and AND gate 38. When EOP pulses 27 arrive at the second input of storage circuit 18, it is cleared or discharged. However, EOP pulses 27 are first delayed $\Delta T_2$ by delay 26 before they are coupled to the other input terminal of storage circuit 30 for clearing or discharging this storage circuit. The delayed EOP pulses are graphically represented in FIG. 2 as pulses 45.

Before storage circuit 30 is discharged, the voltage on terminal L is sampled and appropriately stored in storage circuit 40. This latter sampling is achieved by applying the EOP pulses 27 to one of the inputs of the AND gate 38, which is similar in all respects to AND gates 12 and 26. The other voltage to be applied to the AND gate 38 is developed by coupling the output of the Schmitt trigger 34 to the amplifier 36, which amplifier inverts waveform 49, as shown in FIG. 3 as waveform 51, and couples waveform 51 to AND gate 38. Thus, when waveform 51 is positive, which is the case whenever a voltage is stored in storage circuit 30, a sampling pulse will be coupled to sampler 32 during the time interval that EOP pulses 27 are coupled to AND gate 38.

It will be apparent that prior to the clearing of storage circuit 30, the voltage stored therein will be sampled and stored in storage circuit 40. It is the voltage which is stored in storage circuit 40 at the end of each sample period that will be coupled to the low pass filter 42 and utilized as the intelligence to be coupled to the output circuits (not shown) of the PPM receiver. The output voltages coupled to the low pass filter 42 are graphically represented in FIG. 3 as waveform 61.

Amplifier 36 is a conventional amplifier capable of accurately developing at its output terminal N an inverted or 180° phase shifted voltage with respect to the voltage applied to its input terminal M.

It should be noted at this point that when only one PPM pulse occurs during any one sample period, a voltage representative of the position of this pulse within the deviation period of that sample period will be stored in storage circuit 30 by virtue of the sensing feature of the Schmitt trigger 34 and the gating feature of the AND and OR gates 26 and 52. The voltage stored in storage circuit 30 will then be utilized as the intelligence information to be coupled to the output circuits of the PPM receiver. Also, note that when no PPM pulse occurs during any one sample period, the voltage stored in the storage circuit 40, which represents the position of the PPM pulse selected during the immediately previous sample period, will be utilized as the intelligence information to be coupled to the output circuits of the PPM receiver during this particular sample period.

*Mode of operation—FIGURES 1–3*

To assist in the description of a mode of operation of the block diagram of FIG. 1, it will again be assumed that conventional well known pulse position modulation techniques are utilized by the PPM transmitter (not shown), and that appropriate synchronization between the PPM transmitter and the PPM receiver is provided.

In the embodiment of FIG. 1, the sample period generator 20, which is responsive to synchronizing signals, develops a series of spaced pulses having a time duration between adjacent pulses which is equal to the desired sample period; whereas the deviation period generator 16, which is also responsive to synchronizing signals, develops a square wave having a series of spaced pulses whose pulse widths are equal to a desired deviation period. In the example shown in FIG. 2, each of the deviation periods, $D_1-D_2$, $D_3-D_4$ and $D_5-D_6$, have a time duration less than the time duration of their respective sample periods $S_1-S_2$, $S_2-S_3$ and $S_3-S_4$. Since a detailed description of the advantages of having deviation periods substantially narrower than the sample periods was set forth earlier, it will suffice to merely state here that the prime purpose to this feature is to reduce the undesired effects of any interference pulses which may occur during the early and late portions of the sample periods.

Prior to the application of the first PPM pulse 13 at time $t_0$, the voltage conditions of the circuit elements of FIG. 1 are as follows: (1) The Ramp Generator 14, deviation period generator 16, and sample period generator 20 are each in their low voltage state, such as 0 volts as shown in waveforms 11, 19 and 27, respectively, of FIG. 2; (2) The voltages stored in storage circuits 18, 30 and 40 are seven volts, three volts, and two volts, respectively, as shown in waveforms 29, 47 and 61 of FIGS. 2 and 3; and (3) The Schmitt triggers 34 and 50 are both in their low voltage or ZERO state, such as 0 volts as shown in waveforms 49 and 69 of FIG. 3.

As will be described in considerable detail later, the above storage condition of each of the storage circuits 18, 30 and 40 may be interpreted as follows: (1) One of the pulses received and processed during the sample period immediately previous to sample period $S_1-S_2$ was converted into a PAM pulse having three volts amplitude and appropriately stored in storage circuit 30; (2) The last pulse received during that same sample period was converted into a PAM pulse having seven volts amplitude and appropriately stored in storage circuit 18; and (3) The voltage level of the pulse selected two sample periods prior to sample period $S_1-S_2$ was three volts and this voltage was appropriately stored in storage circuit 40.

Clearly, as between the voltage levels of the pulses stored in storage circuits 18 and 30, storage circuit 30 has a voltage level closer to the voltage level stored in storage circuit 40, i.e. 3 volts is closer to 2 volts than is 7 volts. Accordingly, the logic and decision circuitry of the present invention, which includes difference circuits 44 and 46, comparison circuit 48, Schmitt trigger 50 and OR gate 52, must select as the intelligence information the voltage stored in storage circuit 30 in preference to the voltage stored in storage circuit 18. This is so in view of the previously discussed mathematical fact that when more than one pulse is present during the deviation period of any one sample period, it is most probable that the pulse closest in position to the position of the pulse selected during the immediately previous sample period is the desired intelligence pulse, and such pulse when demodulated will have a voltage level closest to the voltage stored in storage circuit 40 than any other pulse received during that same sample period.

At time $t_0$, the first PPM pulse 13 appears on terminal B. However, since this pulse does not occur within the deviation period $D_1-D_2$, it is not gated through the AND gate 12 to the No. 2 sampler 10, and consequently is not processed by the pulse selecting system of the present invention.

At time $S_1$, the sample period immediately prior to the first sample period $S_1-S_2$ is completed, and the sample period generator 20 develops a first EOP pulse 27, such as shown in FIG. 2, in response to synchronizing signals from the PPM receiver sync circuits (not shown).

The EOP pulse 27 is appropriately coupled to the storage circuit 18, delay 28, and the AND gate 38. Storage circuit 18 is accordingly cleared or discharged at time $S_1$ but the discharge of storage circuit 30 is by design delayed a finite time interval $\Delta T_2$. Before the storage circuit 30 is cleared, the voltage stored thereon must be sampled. This sampling of storage circuit 30 is controlled by AND gate 38. That is to say, during the time between $S_1$ and $t_1$, the Schmitt trigger 34 senses the "storage" condition of storage circuit 30 and develops a negative voltage, such as shown in wave 49 of FIG. 3 at time $S_1$. Amplifier 36 then inverts or phase shifts wave 49 substantially one hundred and eighty degrees and couples this positive voltage (see wave 51) to AND gate 38. Thus, during the time duration of EOP pulse 27 AND gate 38 is opened thereby coupling a positive pulse to the No. 3 sampler 32 (see pulse 53). Accordingly, the voltage stored in storage circuit 30 is sampled during the time duration of pulse 53 and appropriately coupled and stored in storage circuit 40.

In the event, however, that no voltage is stored in storage circuit 30 at the time $S_1$, the Schmitt trigger will sense this "no-storage" condition and develop a positive voltage, which voltage will be inverted by amplifier 36, coupled to AND gate 38, and accordingly inhibit the gate, whereby the voltage stored in storage circuit 30 will not be sampled before storage circuit 30 is "cleared" or discharged by the delayed EOP pulse 45. Accordingly, when storage circuit 30 is in a "no-storage" condition, the voltage intelligence coupled to the low pass filter 42 during that particular sample period will be the same as the voltage intelligence coupled during the immediately previous sample period. It will be apparent at this point that the output voltage coupled through low pass filter 42 to the output circuits (not shown) of the PPM receiver will be whatever voltage is stored in storage circuit 40, and such output voltage may vary depending upon the voltage condition of storage circuit 30 at the end of each sample period.

At time $t_1$, the first delayed EOP pulse 45 is coupled to the storage circuit 30 via terminal K and clears or discharges this circuit. The pulse selecting circuit of FIG. 1 is therefore in condition to process any PPM pulses received during the next sample period $S_1-S_2$.

At time $D_1$ the square wave 11 rises to a positive potential, such as 8 volts, and continues at this level until time $D_2$, whereby the AND gate 12 is opened, and any PPM pulses present on terminal B during this time period will be gated through AND gate 12 to the No. 1 sampler 10 via terminal C.

Note that square wave 11 also opens AND gate 12 during $D_3-D_4$ and $D_5-D_6$, while it inhibits or closes AND gate 12 during times $D_2-D_3$, $D_4-D_5$ and $D_6$ plus. Note also that the PPM pulses 15, which also appear on terminal B, occur within the deviation periods $D_1-D_2$, $D_3-D_4$; whereas, no PPM pulses, not even interference pulses, occur during deviation period $D_5-D_6$. Thus, deviation period $D_1-D_2$ represents the condition in which only the intelligence pulse occurs (no error), deviation period $D_3-D_4$ represents the condition in which more than one pulse occurs (commissive error), and deviation period $D_5-D_6$ represents the condition in which no pulses occur (omissive error).

The square wave 11 developed by deviation period generator 16 is also coupled to the ramp generator 14 via terminal A, wherein a linear sawtooth wave 19 is developed, as shown in FIG. 2. Each sawtooth of wave 19 has a width equal to the pulse width of the square waves of wave 11. Thus, the linear rise of each sawtooth of wave 19 commences or rises at times $D_1$, $D_3$ and $D_5$ and ends or falls at times $D_2$, $D_4$ and $D_6$. Sawtooth wave 19 is appropriately coupled to the No. 1 sampler 10 via terminal D.

At time $t_2$, when the first gated pulse 17 is coupled to the No. 1 sampler 10 via terminal C, the voltage of sawtooth wave 19 at this time interval is coupled to and stored in storage circuit 18. Pulse 21 graphically represents the sampled voltage of sawtooth wave 19 during the time duration of the first gated pulse 17 and appears on terminal E at time $t_2$. The voltage level of pulse 21, which is four volts in the example shown, is accordingly stored in storage circuit 18. Note that the voltage stored in storage circuit 18 at time $t_2$ will be present on terminal G, as graphically represented in wave 29 of FIG. 2.

At time $t_3$, pulse 31, which is effectively the gated pulse 17 delayed $\Delta T_1$ by the delay 24, is applied to AND gate 26 via terminal H. During this same time interval, the Schmitt trigger 34 senses the "no-storage" condition of storage circuit 30 and develops a positive voltage at its output terminal M, as depicted in FIG. 3 as wave 49. The positive swing of wave 49 opens OR gate 52 and couples a positive voltage to the AND gate 26, as shown in FIG. 3 as waveform 71. Thus, at time $t_3$, the AND gate 26 is enabled and the positive pulse 37 (see FIG. 2) is coupled to the No. 2 sampler 22 via terminal I. Accordingly, the voltage stored in storage circuit 18 is sampled during the time duration of pulse 37, and appropriately coupled via terminal J to storage circuit 30 and stored therein.

At time $D_2$, as mentioned earlier, the square wave 11, as well as sawtooth wave 19, fall to a low voltage level thereby completing the deviation period $D_1$–$D_2$ and preventing any PPM pulses thereafter present at terminal B from passing to terminal C. Note here that the first sample period $S_1$–$S_2$ represents the condition in which only the intelligence pulse 15 occurs (no error) during the deviation period $D_1$–$D_2$. Thus, no comparison and decision is made regarding the selection of one pulse from a plurality of pulses present (commissive error), or the coupling of the voltage information stored during the previous sample period (omissive error).

At time $S_2$, sample period $S_1$–$S_2$ is completed and the sample period generator 20 again produces an EOP pulse 27, such as shown in FIG. 2. EOP pulse 27 is again coupled to the storage circuit 18, delay 28 and the AND gate 38. As mentioned above, storage circuit 18 will be immediately cleared at time $S_2$ but the storage circuit 30 will not be cleared until the expiration of a finite time interval $\Delta T_2$. This delay in clearing storage circuit 30 is necessary so that this storage circuit may be sampled. This sampling of storage circuit 30 is again controlled by AND gate 38. Since storage circuit 30 is in a "storage" condition at time $S_2$, the Schmitt trigger 34 senses such condition and develops a negative voltage, such as shown in wave 49 of FIG. 3 at time $S_2$. Again amplifier 36 inverts wave 49 and couples a positive voltage (see wave 51) to AND gate 38. Accordingly, during the time duration of EOP pulse 27, AND gate 38 is opened and thereby couples a positive pulse to the No. 3 sampler 32 (see pulse 53). The voltage stored in storage circuit 30 is accordingly sampled during the time duration of pulse 53 and appropriately coupled via terminal Q to storage circuit 40 and stored therein.

It will be apparent at this point that the four volts stored in storage circuit 30 represents the desired intelligence to be coupled to the output circuits of the PPM receiver (not shown) via the low pass filter 42. This is so since the position of the only intelligence pulse received during deviation period $D_1$–$D_2$ represents a voltage level of four volts, as graphically shown as pulse 21 of FIG. 2, and it is this voltage level that is to be utilized as the intelligence transmitted by the PPM transmitter.

At time $t_4$, the second delayed EOP pulse 45 appears on terminal K and clears or discharges storage circuit 30. Thus, the pulse selecting system of FIG. 1 is now in condition to receive, analyze, compare and decide what voltage information will be coupled to the PPM receiver output circuits during the next sample period $S_2$–$S_3$.

At time $D_3$, the square wave 11 again rises to a positive six volt level and continues at this level until time $D_2$ whereupon any PPM pulses present on terminal B will be gated through AND gate 12 to the No. 1 sampler 10 via terminal C. Again, square wave 11 controls the sawtooth 19 produced by ramp generator 14, which sawtooth voltage is coupled to the No. 1 sampler via terminal D.

At time $t_5$ the second gated pulse 17 is coupled to the No. 1 sampler 10, and the voltage of sawtooth wave 19 during the time duration of this pulse is coupled to and stored in storage circuit 18. Pulse 23 graphically represents the sampled voltage of sawtooth wave 19 and it appears on terminal E at time $t_5$. The voltage level of pulse 23, in the example shown, is two volts and this voltage level is also present on terminal G, as shown in wave 29 of FIG. 2.

At time $t_6$, pulse 33, which is gated pulse 17 delayed $\Delta T_1$ by delay 24, is applied to AND gate 26 via terminal H. Again, Schmitt trigger 34 senses the "no-storage" condition of storage circuit 30 and again develops a positive voltage at its output terminal M, which voltage opens OR gate 52. Thus, at time $t_6$, AND gate 26 is enabled and the positive pulse 37 is appropriately coupled to the No. 2 sampler 22 via terminal I. As described earlier, the voltage stored in storage circuit 18 is sampled during the time duration of pulse 37, and stored in storage circuit 30.

At time $t_7$, the third gated pulse 17 is coupled to the No. 1 sampler 10 and the voltage of sawtooth wave 19 during the time duration of this pulse is again coupled to and stored in storage circuit 18. Pulse 25 represents the sampled voltage of sawtooth wave 17, and it appears on terminal E at time $t_7$. The voltage level of pulse 25 in this example is five volts and is also present on terminal G, as shown in wave 29 of FIG. 2.

Figure 6:
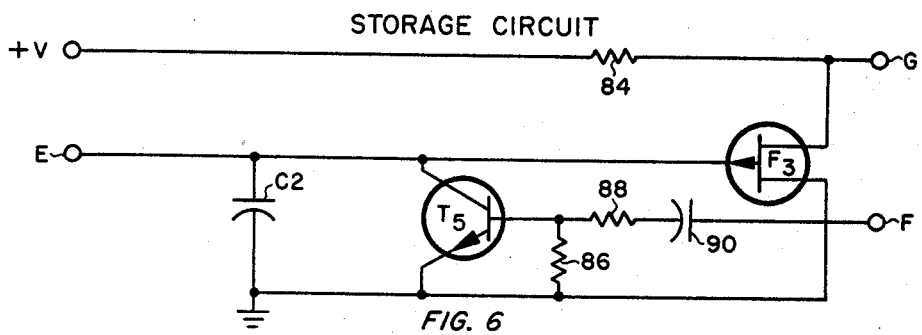

It will be recalled at this point that storage circuit 18 has not been cleared since the storage of pulse 23 therein at time $t_5$, and that the two volt level of pulse 23 is still stored in this circuit when pulse 25 appears on terminal E at time $t_7$. Note here that storage circuits 18 and 30, is well as storage circuit 40, are of the type which charge or discharge to the voltage level of any pulse applied to its input terminal notwithstanding the fact that a voltage is still stored in the circuit at the time such pulse is applied. Storage circuits of this type are well known and an example of one is shown in FIG. 6. Accordingly, storage circuit 18 will charge to the voltage level of pulse 25, i.e., 5 volts, when this pulse appears on terminal E at time $t_7$.

Note also, that the clearing or discharging of storage circuits 18 and 30 at time intervals $S_1$, $S_2$, $S_3$, $S_4$, etc. is preferable so that the logic and decision circuits of the present invention will accurately select a pulse, if such be necessary, from all pulses received during any one sample period without any interference from voltage information stored during any previous sample period.

At time $t_8$, pulse 35, which is gated pulse 17 delayed $\Delta T_1$ by delay 24, is applied to AND gate 26 via terminal H. The Schmitt trigger 34 this time senses the "storage" condition of storage circuit 30 and develops a negative voltage at its output terminal M, which voltage does not open the OR gate 52. At this point in time the circuit of FIG. 2 must decide whether the voltage level of pulse 23, which is stored in storage circuit 30, is closer to the voltage level of pulse 21, which is stored in storage circuit 40, than is the voltage level of pulse 25, which is stored in storage circuit 18. This decision is necessary since more than one PPM pulse appeared on terminal B during the deviation period $D_3$–$D_4$ of sample period $S_2$–$S_3$. Such decision is achieved as follows:

The four volts stored in storage circuit 40 and present on terminal R is substracted in difference circuit 44 from the five volts stored in storage circuit 18 and present on terminal G; whereas the two volts stored in storage circuit 30 and present on terminal L is substracted in difference circuit 46 from the four volts stored in storage circuit 40 and present on terminal R. Thus, by letting the voltages stored in storage circuits 18, 30 and 40 be respectively represented by the letter (a), (b) and (c), then the difference voltage at the output terminal S of difference circuit 44 will be $$(d) = (a) - (c)$$

whereas the difference voltage at the output terminal T of difference circuit 46 will be, $$(e) = (c) - (b)$$

The difference voltages (d) and (e) are then coupled to comparison circuit 48. When the voltage (d) is greater than the voltage (e), the Schmitt trigger 50 is driven to its low voltage condition or ZERO state, as shown in wave 69 at times $t_3$ and $t_8$; whereas, when voltage (d) is less than voltage (e), the Schmitt trigger 50 is driven to its high voltage condition or ONE state, as shown in wave 69 at times $t_1$ and $t_4$. Thus, when Schmitt trigger 50 is in its ZERO state, i.e. $f'=0$, the OR gate 52 is not opened and consequently the AND gate 26 is inhibited so that the voltage stored in storage circuit 18 is not sampled and stored in storage circuit 30. However, when Schmitt trigger 50 is in its ONE state, i.e., $f'=1$, the OR gate 52 is opened and consequently AND gate 26 is enabled thereby causing the voltage stored in storage circuit 18 to be sampled during the time duration of pulse 35, and appropriately stored in storage circuit 30.

It will be apparent at this point, that the difference circuits 44 and 46, comparison circuit 48, Schmitt trigger 50 and OR gate 52 in combination make the decision as to whether the voltage at terminal G is closer to the voltage at terminal R than is the voltage at terminal L. If such be the case, storage circuit 30 is charged or discharged to the voltage level present at terminal G. The foregoing decision feature occurs each time more than one pulse appears on terminal B during the deviation period of any sample period. Thus, storage circuit 30 will always be charged to the voltage level of the very first pulse appearing on terminal E during any deviation period, and will thereafter charge to the voltage level of the pulse of a plurality of pulses appearing on terminal E which is closest in amplitude to the voltage level of the pulse selected during the previous sample period.

At time $D_4$, the square wave 11 and sawtooth 19 again fall to a low voltage level thereby completing the deviation period $D_3$–$D_4$, and preventing any PPM pulses thereafter present on terminal B from passing to terminal C. Note here that the second PPM pulse 13 appears on terminal B at approximately time $D_4$ but is not gated through to terminal C because the low voltage level of square wave 11 inhibits the AND gate 12. Note also, that deviation period $D_3$–$D_4$ represents the condition in which more than one pulse (commissive error) appears on terminal B during the deviation period $D_3$–$D_4$.

At time $S_3$, sample period $S_2$–$S_3$ is completed and the sample period generator 20 again produces an EOP pulse 27, such as shown in FIG. 2. EOP pulse 27 is again coupled to storage circuit 18, delay 28 and the AND gate 38. As mentioned above storage circuit 18 will be immediately cleared at time $S_3$, but storage circuit 30 will not be cleared until a finite time interval $\Delta T_2$ expires. Before $\Delta T_2$ expires, storage circuit 30 will again be sampled and the sampling thereof is again controlled by AND gate 38. Again, since storage circuit 30 is in its "storage" condition Schmitt trigger 34 senses such condition, develops a negative voltage, such as shown in wave 49 of FIG. 3 at time $S_3$, and couples such negative voltage to the amplifier 36, which in turn inverts wave 49 and couples same to AND gate 38 (see wave 51). Accordingly, during the time duration of EOP pulse 27, AND gate 38 is enabled thereby coupling a positive pulse to the number 3 sampler 32 (see pulse 53). The voltage stored in storage circuit 30 is thereby sampled during the time duration of pulse 53 and appropriately coupled and stored in storage circuit 40.

It should be noted at this point that the five volts stored in storage circuit 30 represent the voltage level of the latter pulse appearing on terminal C during time duration $D_3$–$D_4$, and such stored voltage represents the desired intelligence to be coupled to the output circuit of the PPM receiver (not shown) via the low pass filter 42. This is so since the position of the last pulse appearing on terminal B during deviation period $D_3$–$D_4$ is closer to the position of the pulse selected during deviation period $D_1$–$D_2$ of the previous sample period $S_1$–$S_2$. The voltage stored in storage circuit 30 is graphically represented as pulse 25 of FIG. 2 and it is this voltage that is to be utilized as the intelligence transmitted by the PPM transmitter during the sample period $S_2$–$S_3$.

At time $t_9$ the third delayed EOP pulse 45 is coupled to storage circuit 30 and clears the circuit. Thus, the pulse selecting system of FIG. 1 is now in condition to receive, analyze, compare and decide, if necessary, what voltage information should be coupled to the PPM receiver output circuits during the next sample period $S_3$–$S_4$.

At time $D_5$ the square wave 11 again rises to a positive 6 volt level and continues at this level until time $D_6$, whereupon any PPM pulses present on terminal B will be gated through AND gate 12 to the No. 1 sampler 10 via terminal C. Note here that no pulses appear on terminal B during the deviation period $D_5$–$D_6$ therefore storage circuits 18 and 30 will not be charged. Thus, no decision will be made nor is such necessary by the difference circuits 44 and 46 and comparison circuit 48. Although a pulse appears on terminal B at time $t_{10}$ this pulse will not be gated to terminal C since it occurs outside of the deviation period $D_5$–$D_6$.

At time $S_4$, sample period $S_3$–$S_4$ is completed and the sample period generator 20 again produces an EOP pulse 27. As stated above, storage circuit 18 will be immediately discharged; whereas, storage circuit 30 will not be discharged until a finite time interval $\Delta T_2$ expires. Of course, since storage circuits 18 and 30 are not charged during deviation $D_5$–$D_6$ no actual discharge takes place. However, the Schmitt trigger 34 still senses the "no storage" condition of storage circuit 30 and develop a positive voltage at its output terminal M, which voltage will be inverted by amplifier 36 and coupled to AND gate 38 via terminal N. Since the voltage at terminal N is negative, AND gate 38 will be inhibited and no gating voltage will be coupled to sampler No. 3.

At time $t_{11}$, the fourth delayed EOP pulse 45 will be coupled to the storage circuit 30 and will discharge this circuit in the same manner as above described. However, since no pulse occurred during deviation period $D_5$–$D_6$, the voltage stored in storage circuit 40 will be utilized as the intelligence information to be coupled to the output circuits of the PPM receiver during sampler period $S_3$–$S_4$.

*Detailed description—FIGS. 4–8*

These figures are included herein to exemplify circuits which may be incorporated in the block diagram of FIG. 1. It is to be understood, however, that other well known circuits may also be utilized in lieu thereof without departing from the spirit and scope of the present invention.

Figure 4:
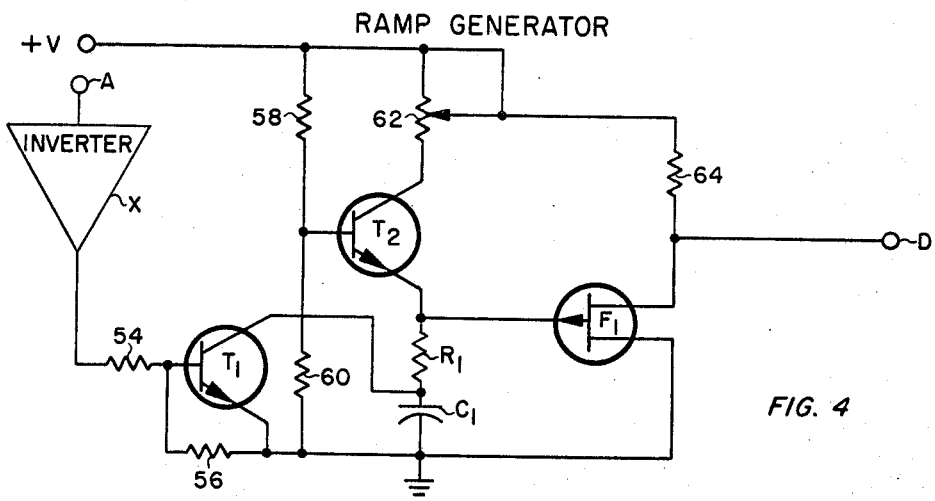

Referring first to FIG. 4, there is shown an exemplary ramp generator which may be utilized as the ramp generator 14 of FIG. 1. The input and output terminals A and D, respectively, of ramp generator 14 of FIG. 1 are graphically represented in FIG. 4 as terminals A and D also. The description and operation of this circuit is as follows:

Squarewave 11, which is developed by the deviation generator 16, is coupled to inverter X via terminal A, wherein the squarewave is inverted or phase shifted substantially 180°. The output of inverter X is then coupled to the base of transistor $T_1$ via limiting resistor 54, thereby driving transistor $T_1$ into conduction. When transistor $T_1$ conducts, capacitor $C_1$ is prevented from charging above ground potential. Thus, when the inverted square wave applied to transistor $T_1$ is negative, the condenser $C_1$ charges toward +V potential, and conversely, when the inverted square wave is positive, the condenser $C_1$ discharges through the collector-emitter path of transistor $T_1$ and is prevented from charging until the transistor $T_1$ is again driven into its non-conducting condition, such as during deviation periods $D_1$–$D_2$, $D_3$–$D_4$ and $D_5$–$D_6$. A resistor 56 is coupled across the base and emitter electrodes of transistor $T_1$ and conventionally functions as an emitter-base return. Transistor $T_2$ in this circuit functions as a constant current source for the capacitor $C_1$, and thereby permits the capacitor to be charged linearly, such as shown in waveform 19 of FIG. 2. The resistors 58 and 60 are connected in a voltage divider arrangement between source $+V$ and ground, and provide biasing potential for the base electrode of transistor $T_2$ whereas, resistor 62 functions conventionally as a biasing resistor for the collector electrode of transistor $T_2$. Resistor 62 may be a potentiometer, such as shown in FIG. 4, for controlling the slope of the ramp wave 19 and for biasing the collector of transistor $T_2$.

The field effect transistor $F_1$ of FIG. 4 has its source electrode connected to terminal D, its drain electrode connected to ground, and its gate electrode connected to the junction of resistor $R_1$ and the emitter electrode of transistor $T_2$. Field effect transistor $F_1$ conventionally functions as a high impedance coupling element in many respects similar to a conventional vacuum tube emitter-follower. Thus, the output of the ramp generator, which is developed across load resistor 64, will be substantially equal to the charge across capacitor $C_1$. Resistor $R_1$ is coupled between capacitor $C_1$ and the gate electrode of transistor $F_1$ to compensate for the inherent potential offset between the gate electrode and source electrode of transistor $F_1$. It will be apparent from the foregoing that whenever transistor $T_1$ is driven into non-conduction, capacitor $C_1$ linearly charges and that the voltage on capacitor $C_1$ will be coupled to terminal D via transistor $F_1$.

Figure 5:
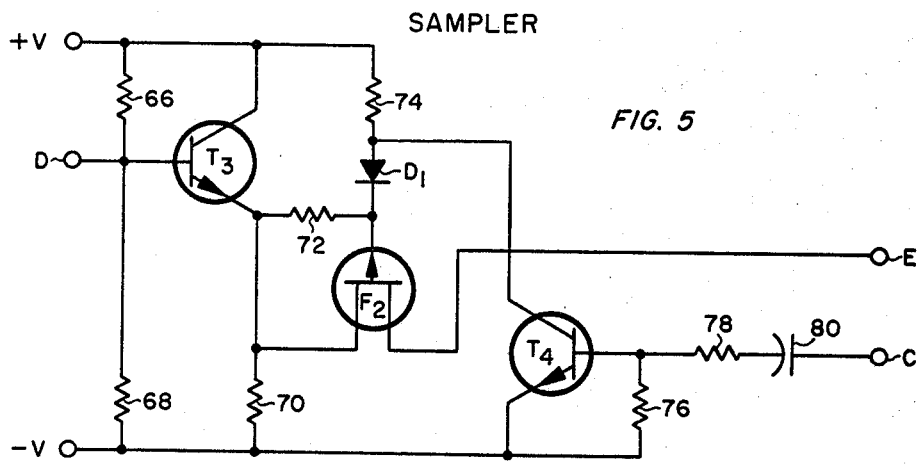

Referring next to FIG. 5, there is shown an exemplary sampler which may be utilized as the sampler 10, 22 or 32 of FIG. 1. The terminals C–D–E of sampler 10 of FIG. 1 are graphically represented in FIG. 5 as terminals C–D–E also. Note here that terminals I–G–J and P–L–Q of samplers 22 and 32, respectively, correspond to terminals C–D–E of FIG. 5, and that the following description of the sampler of FIG. 5, with respect to terminals C–D–E, is equally applicable in principle and function to samplers 22 and 32, with respect to terminals I–G–J and P–L–Q, respectively.

When gating pulses, such as pulses 17 of FIG. 2, are present on terminal C of FIG. 5, and coupled via limiting resistor 78 and coupling capacitor 80, to the base of transistor $T_4$, this transistor conducts thereby causing current to flow through the current path comprising $+V$ source, resistor 74, collector-emitter electrodes of transistor $T_4$, to the $-V$ source. Current flow through resistor 74 causes the voltage at the anode of diode $D_1$ to fall substantially to $-V$ volts and thereby back bias the diode $D_1$. Note at this point that when diode $D_1$ is forward biased, as is the case when transistor $T_4$ is non-conducting, $+V$ volts is substantially coupled to the gate electrode of field effects transistor $F_2$ via resistor 74 and diode $D_1$. However, when diode $D_1$ is back-biased the potential at the gate electrode of $F_2$ is at the same potential as the potential of the drain electrode of $F_2$ since resistor 72 is substantially floating. That is to say, since the drain electrode of $F_2$ is directly coupled to the emitter of $T_3$ and since the gate electrode is connected to the emitter of $T_3$ via resistor 72 and further since resistor 72 will not draw current when diode $D_1$ is back biased, the potential of the emitter of $T_3$ will be effectively coupled to both the gate and drain electrodes of $F_2$. As is well known to those skilled in the solid state art, when a field effect transistor has its gate electrode and drain electrode at equal potentials, the field effect transistor becomes ohmic, i.e., it acts like a low value resistor. Thus, whatever voltage is present at the emitter of transistor $T_3$, it will be coupled to the terminal E via the drain and source electrodes of $F_2$.

Transistor $T_3$ of FIG. 5 is coupled in a common emitter-follower arrangement and has its base electrode coupled to terminal D via the junction resistors 66 and 68, which resistors are series connected in a voltage divider arrangement between $+V$ and $-V$. The collector of $T_3$ is directly coupled to $+V$ for biasing purposes; whereas the emitter of $T_3$ is connected to $-V$ via load resistor 70. Resistor 76 is connected across the base and emitter of $T_4$ and conventionally functions as an emitter-base return. It will be apparent from the foregoing that whenever a positive potential of sufficient value, such as 6 volts as in the example of FIGS. 1–3, is present on terminal C, the voltage present on the emitter of $T_3$, which is substantially the voltage applied to terminal D, is coupled to the terminal E via $F_2$. Thus, the voltage at terminal D is sampled and coupled to terminal E during the time duration of the voltage at terminal C.

Referring now to FIG. 6, there is shown a storage circuit which may be utilized as the storage circuit 18, 30 or 40 of FIG. 1. The terminals E–F–G of storage circuit 18 of FIG. 1 are graphically represented as terminals E–F–G in FIG. 6 also. Note here that terminals J–K–L of storage circuit 30 corresponds to terminals E–F–G of FIG. 6, and terminals Q–R of storage circuit 40 correspond to terminals E–G of FIG. 6, and that the following description of the storage circuit of FIG. 6 is equally applicable in principle and function to storage circuits 30 and 40 with respect to terminals J–K–L and Q–R, respectively. Further note that storage circuit 40 is not cleared or discharged at the end of each sample period and correspondingly will not include transistor $T_5$ and related components.

When a voltage is applied to terminal E, it is stored in capacitor C, and appears at terminal G. This is so since the current flow from $+V$ to ground through the source and drain electrodes of the field effect transistor $F_3$ is controlled by the potential applied to the gate electrode thereof, which gate electrode is connected to the positive side of capacitor $C_2$. Field effect transistor $F_3$ has its source connected to terminal G, i.e., load resistor 84, while its drain electrode is directly connected to ground. It will be apparent that by proper selection of the $+V$ source and load resistor 84, the voltage appearing on terminal G will be substantially equal to the voltage applied at terminal E. The field effects transistor $F_3$ is preferred as the coupling element between terminals E and G since it presents a considerably high impedance to the capacitor $C_2$, thereby preventing undesirable leakage of the charge on capacitor $C_2$ when transistor $T_5$ is non-conducting. Resistor 86 conventionally functions as an emitter-base return for transistor $T_5$. The storage circuit of FIG. 6 may be "cleared" or discharged by coupling a positive pulse such as EOP pulse 27 of FIG. 2, to the base of transistor $T_5$ via limiting resistor 88 and coupling capacitor 90, thereby driving $T_5$ into conduction and providing a DC discharge path to ground for capacitor $C_2$ through the collector and emitter electrodes of $T_5$. It will be apparent from the foregoing that the voltage applied to terminal E will be stored on capacitor $C_2$, and that voltage equal to the voltage at terminal E will be present on terminal G until a discharge EOP pulse appears on terminal F.

Figure 7:
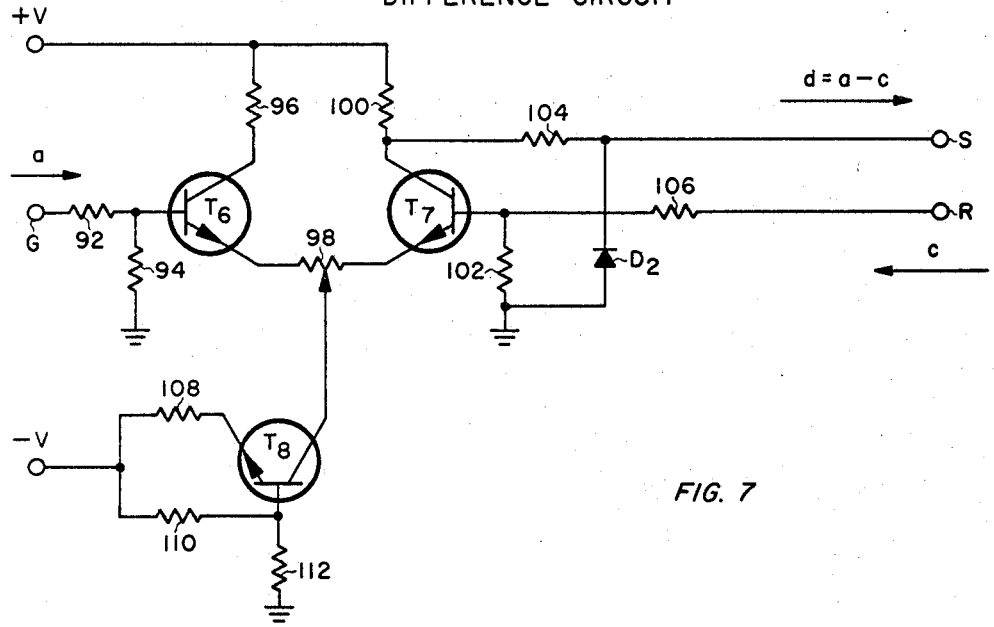

Referring now to FIG. 7, there is shown an exemplary difference circuit which may be utilized as the difference circuit 44 or 46 of FIG. 1. The terminals G–R–S of the difference circuit 44 of FIG. 1 are graphically represented in FIG. 7 as terminals G–R–S also. Note that terminals L–R–T of difference circuit 46 respectively correspond to terminals G–R–S of FIG. 7, and that the following description of the difference circuit of FIG. 7, with respect to terminals G–R–S is equally applicable in principle and function to difference circuit 46 with respect to terminals L–R–T.

When two input voltages are respectively present at terminals G and R, the output of this circuit at terminal S will be equal to the signal at R subtracted from the signal at G. Basically, transistor $T_6$ operates as an emitter-follower so that the signal at terminal G, which is coupled to the base electrode of $T_6$ via limiting resistor 92 and developed across resistor 94, appears at the emitter electrode of $T_6$ and correspondingly also appears at the emitter electrode of transistor $T_7$. Thus, when the signal applied at terminal G appears at the emitter electrode of $T_7$, it is equivalent to the inverse of that signal being applied to the base electrode of $T_7$, so that the collector electrode of $T_7$ will effectively produce across its load resistor 100 an analog voltage representing the signal at R subtracted from the signal at G. Resistor 96 in this circuit is coupled between the +V source and the collector of $T_6$ and functions as a load resistor whereas potentiometer 98 coupled between the emitters of $T_6$ and $T_7$ provides means for balancing the circuit. The signal appearing at terminal R is conventionally coupled to the base electrode of $T_7$ via limiting resistor 106 and is developed across resistor 102. Resistor 104 which couples the collector electrode of $T_7$ to terminal S is a limiting resistor while the diode $D_2$ which is coupled between terminal S and ground clamps terminal S to ground and prevents it from falling to a potential lower than ground. Transistor $T_8$ is a conventional constant current source having its collector electrode connected to the slider of potentiometer 98 and its emitter electrode connected to —V source via limiting resistor 108. The base electrode of $T_8$ is connected to ground via resistor 112 while the resistor 110 functions as an emitter-base return. It will be apparent from the foregoing that when signals are present at both terminals G and R that the output at terminal S will represent the signal at terminal R subtracted from the signal at terminal G, and that such difference signal cannot fall below ground.

Figure 8:
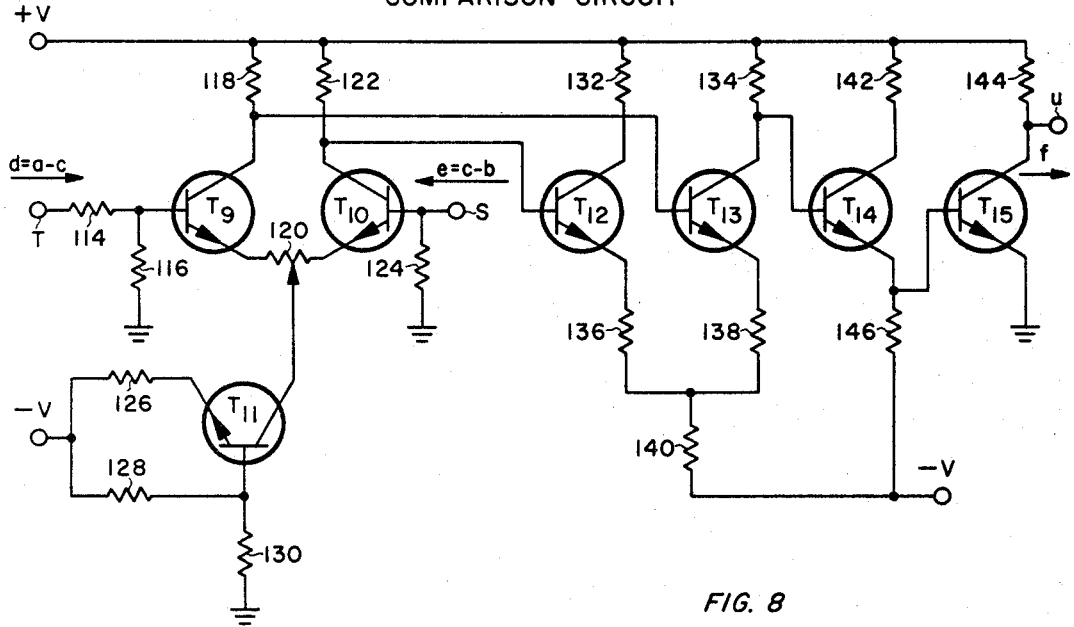

Referring now to FIG. 8, there is shown an exemplary comparison circuit which may be utilized as the comparison circuit 48 of FIG. 1. The terminals S–T–U of the comparison circuit of FIG. 1 are graphically represented in FIG. 8 as terminals S–T–U also. Note that transistors $T_9$, $T_{10}$ and $T_{11}$ along with their associated resistors function in all respects, the same as above described with regard to transistors $T_6$, $T_7$, and $T_8$ of FIG. 7. In this circuit, however, the difference voltages (d) and (e) which are respectively developed across load resistors 118 and 122, are coupled to the base electrodes of transistors $T_{13}$ and $T_{12}$, respectively. Transistors $T_{12}$ and $T_{13}$ are conveniently connected in circuit as amplifiers, with only the output developed across the load resistor 134 of transistor $T_{13}$ being coupled to transistor $T_{14}$. Transistor $T_{14}$ is conventionally connected in circuit as an emitter-follower with its output being developed across load resistor 146 and being coupled to the base of coupling transistor $T_{15}$. Transistor $T_{15}$ is conventionally coupled in circuit as a grounded emitter amplifier with its output being developed across load resistor 144 and being coupled to output terminal U. Note here that transistors $T_{12}$ and $T_{13}$ are biased so that when the voltage (d) exceeds the voltage (e), the current through resistor 134 will drop below a threshold value thereby causing the voltage at the base electrode of transistor $T_{14}$ to increase. When this increase in voltage at the base electrode of transistor $T_{14}$ occurs, a corresponding increase in voltage at the base electrode of transistor $T_{15}$ occurs, thereby increasing circuit flow through $T_{15}$ and decreasing the voltage present on terminal U. Accordingly, Schmitt trigger 50 in FIG. 1 is designed to sense this drop in voltage at terminal U and produce a low potential voltage at its output terminal V, such as zero volts as shown at time $t_8$ in waveform 69 of FIG. 3. Of course, the converse will be true when the difference voltage (d) is less than the difference voltage (e) (note waveform 69 at time $t_4$). The logic of comparison circuit 48 and Schmitt trigger 50 is shown in the middle of FIG. 1 under the heading NOTE. It will be apparent, therefore, that when voltage (d) exceeds voltage (e), OR gate 52 will not be opened; whereas, when voltage (d) is less than voltage (e), OR gate 52 will be opened and correspondingly enable AND gate 26 and permit sampler 22 to sample the voltage stored in storage circuit 18.

*Detailed description—FIGURE 9*

This figure sets forth an alternate embodiment of the pulse selecting technique of the present invention. Basically, the circuit of FIG. 9 functions in many respects in the same manner as the circuit of FIG. 1. Therefore, for purposes of simplicity and clarity of understanding, the circuit elements of FIG. 9, which functions the same as corresponding circuit element of FIG. 1, having been given the same reference numeral.

The prime difference between the circuit of FIGS. 1 and 9 is: (1) the elimination of delay 28, Schmitt trigger 34, amplifier 36, AND gate 38, the storage clearing transistor in the storage circuits 18, 30 and 40 and the application of EOP pulses 27 and 45 respectively to the storage circuits 18 and 30; (2) the direct application of EOP pulses 27 to the sampler 32; and (3) the addition of delay 28' and flip-flop 34'.

Referring specifically to FIG. 9, the circuits between terminals A to E, G to L and Q to W are identical to FIG. 1. Note again that the circuits between terminals L to P are excluded.

The control of OR gate 52 is therefore the prime difference between FIGS. 1 and 9. That is to say, the sensing of the storage condition of storage circuit 30 is no longer necessary to insure that the first pulse received during any one deviation period will be coupled to and stored in storage circuit circuit 30. Instead of sensing the condition of storage circuit 30, the flip-flop 34' has its output coupled to the OR gate 52 whereby this gate will be opened by the flip-flop 34' when it is in one of its stable states and will not be opened by the flip-flop 34' when it is in its other stable state. This control of OR gate 52 by flip-flop 34' is accomplished as follows:

When an EOP pulse 27 is developed by sample period generator 20, it is coupled to set terminal of flip-flop 34' so as to drive the flip-flop into its first stable state, and develop a positive voltage at its output terminal MM. This positive voltage at terminal MM passes through OR gate 52, which voltage in turn enables AND gate 26. Thus, when the first delayed PPM pulse appears on terminal H, the voltage in storage circuit 18 will be sampled by sampler 22 and stored in storage circuit 30. The pulse on terminal H is also coupled to delay 28' wherein it experiences a finite time delay $\Delta T_3$. Time delay $\Delta T_3$ must be long enough to permit the pulse at terminal H to enable AND gate 26 and sample the voltage stored in storage circuit 18. The delayed PPM pulse is then coupled to the reset terminal R of flip-flop 34' via terminal KK wherein flop-flop 34' is driven to its second stable state and develops a negative voltage at its output terminal MM. Thus, no positive voltage from flip-flop 34' passes through OR gate 52 so that the gating of AND gate 26 will now depend upon the condition of Schmitt trigger 50 which is controlled by the logic circuit comprising difference circuits 44 and 46 and comparison circuit 48.

It will be apparent from the foregoing that the unique arrangement of memory and logic circuits of the present invention, advantageously provide a novel pulse selecting system capable of receiving position modulated pulses and randomly occurring interference signals of equal amplitude in spaced time frames, whereby the pulse of a plurality of pulses occurring during any one time frame, which is closest in position to the position of the pulse selected during the immediately previous time frame, is selected and utilized as the intelligence pulse. This invention, therefore, provides a novel technique for reducing the undesirable effects of omissive or commissive errors in a PPM communication system.

The terms and expressions which have been employed herein are used as terms of description and not of limitation and it is not intended, in the use of such terms and expressions, to exclude any equivalents of the features shown and described, or portions thereof, but it is recog-

I claim:

1. A pulse selecting system comprising in combination:
   (a) input means for receiving position modulated signal pulses and randomly occurring noise pulses in spaced time frames;
   (b) converting means coupled to said input means for converting all of said received pulses into amplitude modulated pulses; and
   (c) selecting means coupled to said converting means for selecting from the plurality of pulses received during any one of said time frames, the pulse which is closest in amplitude to the amplitude of the pulse selected during a previous time frame.

2. A pulse selecting system comprising in combination:
   (a) input means for receiving position modulated signal pulses and randomly occurring noise pulses in spaced time frames;
   (b) converting means coupled to said input means for converting the position of all of said received pulses into amplitude modulated pulses;
   (c) selecting means coupled to said converting means for selecting from the pulses received during any one time frame, the pulse which is closest in amplitude to the amplitude of the pulse selected during the immediately previous time frame; and
   (d) output means coupled to said selecting means for producing an output signal representative of the amplitude of said pulse selected during said one time frame.

3. A pulse selecting system comprising in combination:
   (a) input means for receiving a position modulated pulse train having a series of spaced time frames in which an intelligence pulse may appear, said pulse train being subjected to interference pulses in said time frames;
   (b) selecting means coupled to said input means for selecting from the plurality of pulses received during any one of said time frames, the pulse which is closest in position to the position of the pulse selected during the immediately previous time frame; and
   (c) output means coupled to said selecting means for producing an output signal representative of the amplitude of said pulse selected during said one time frame.

4. A pulse selecting system comprising in combination:
   (a) input means for receiving a position modulated pulse train having a series of spaced time frames in which an intelligence pulse may appear, said pulse train being subjected to interference pulses in said time frames;
   (b) converting means coupled to said input means for converting the position of all of said received pulses into amplitude modulated pulses;
   (c) selecting means coupled to said converting means for selecting from the plurality of pulses received during any one time frame, the pulse which is closest in amplitude to the amplitude of the pulse selected during the immediately previous time frame; and
   (d) output means coupled to said selecting means for producing an output signal representative of the amplitude of said pulse selected during said one time frame.

5. A pulse selecting system comprising in combination:
   (a) input means for receiving position modulated signal pulses and randomly occurring noise pulses in spaced time frames;
   (b) demodulating means coupled to said input means for converting said signal and noise pulses into amplitude modulated pulses;
   (c) memory means coupled to said demodulating means for storing during any one time frame only one of said amplitude modulated pulses;
   (d) comparing means coupled to said demodulating means and memory means for sequentially comparing the amplitude of said stored pulse with the amplitude of each amplitude modulated pulse occurring during the immediately subsequent time frame;
   (e) first gating means coupled to said comparing means and memory means for selecting as the intelligence pulse for said subsequent time frame, the pulse occurring during said subsequent time frame which has an amplitude nearest to the amplitude of said stored pulse; and
   (f) second gating means for coupling said selected pulse to said memory means for storage therein at the completion of said subsequent time frame.

6. A pulse selecting system comprising in combination:
   (a) input means for receiving position modulated signal pulses and randomly occurring noise pulses in spaced time frames;
   (b) demodulating means coupled to said input means for converting said signal and noise pulses into amplitude modulated pulses;
   (c) memory means coupled to said demodulating means for storing during any one time frame only one of said amplitude modulated pulses;
   (d) first difference means adapted to receive the first amplitude modulated pulse occurring during the time frame immediately subsequent to said one time frame and to develop a first voltage representing the amplitude difference between said first pulse and said stored pulse;
   (e) second difference means adapted to receive the second amplitude modulated pulse occurring during said subsequent time frame, and to develop a second voltage representing the amplitude difference between said second pulse and said stored pulse;
   (f) comparison means coupled to said first and second difference means for developing a third voltage representing the amplitude difference between said first and second voltages;
   (g) gating means coupled to said comparison means and memory means for coupling said first pulse to said memory means for storage therein only when said first voltage is less than said second voltage, and for coupling said second pulse to said memory means for storage therein only when said first voltage is greater than said second voltage; and
   (h) output means for coupling the voltage levels stored in said memory means to the output circuits of said pulse selecting system.

7. A pulse selecting system comprising in combination:
   (a) input means for receiving a position modulated pulse train having a series of spaced sample periods in which an intelligence pulse and interference pulses may appear;
   (b) demodulating means coupled to said input means for converting all pulses received during said sample period into amplitude modulated pulses;
   (c) first memory means for storing during any one of said sample periods, the voltage level of the pulse selected during the immediately previous sample period;
   (d) second memory means for storing the voltage level of the first pulse received during said one sample period;
   (e) third memory means for storing the voltage level of the second pulse received during said one sample period;

(f) comparing means for separately comparing the voltage levels stored in said second and third memory means with the voltage level stored in said first memory means, said comparing means being capable of determining which of said first and second pulses has a voltage level closer to the voltage level of said pulse selected during said previous sample period;

(g) first gating means coupled to said comparing means for coupling the one pulse of said first and second pulses which is closer in amplitude to the amplitude of said previously selected pulse, whereby said second memory means will be charged to the amplitude of said coupled pulse;

(h) second gating means for causing the voltage level of said first memory means to be equal to the voltage level stored in said second memory means at the end of said one sample period; and (i) output means for coupling the voltage levels stored in said first memory means to the output circuits of said pulse selecting system.

8. A pulse selecting system in accordance with claim 7, wherein said comparing means includes:

(a) first and second difference circuits adapted to respectively receive at one of their input circuits the voltage level stored in said second and third memory means, and adapted to each receive at their other input circuit the voltage level stored in said first memory means, whereby said first and second difference circuits respectively develop first and second difference voltages;

(b) a comparison circuit adapted to receive said first and second difference voltages and to develop a third voltage; and (c) a trigger circuit coupled between said first gating means and said comparison circuit for developing a gating voltage in response to said third voltage, whereby said gating voltage enables said first gating means when said first voltage is greater than said second voltage and inhibits said first gating means when said first voltage is less than said second voltage.

9. A pulse selecting system in accordance with claim 7 and further including:

(a) a trigger circuit adapted to sense the storage condition of said second memory means and to develop a gating voltage which gating voltage enables said first gating means only during the time duration of said first pulse, whereby said second memory means will always be initially charged to the voltage level of the first amplitude modulated pulse occurring during any of said sample periods.

10. A pulse selecting system in accordance with claim 9 and further including:

(a) a sample period generator for developing end-of-period pulses; and (b) an AND gate coupled to receive said gating voltage of said trigger and said end-of-period pulses, whereby said second gating means is enabled when said trigger develops a gating voltage concurrently with the time duration of said end-of-period pulses.

11. A pulse selecting system in accordance with claim 7 and further including:

(a) a bistable circuit adapted to receive said amplitude modulated pulses and adapted to be driven into its first stable state when said first pulse arrives and to be driven into its second stable state a finite time interval thereafter and to remain in its second stable state until the end of said one sample period;

(b) said bistable circuit being further adapted to enable said first gating means only when it is in its first stable state, whereby said second memory means will always be initially charged to the voltage level of the first amplitude modulated pulse occurring during any of said sample periods.

12. A pulse selecting system in accordance with claim 11, and further including:

(a) a sample period generator for developing end-of-period pulses; and (b) a delay network coupled between said input means and said bistable circuit;

(c) said end-of-period pulses being coupled to one input of said bistable circuit, and said amplitude modulated pulses being coupled through said end-of-period pulses drive said bistable circuit into its first stable state and said delayed amplitude modulated pulses drive said bistable circuit into its second stable state.

13. A pulse selecting system comprising in combination:

(a) input means for receiving a position modulated pulse train having a series of spaced sample periods in which an intelligence pulse and interference pulses may appear;

(b) demodulating means coupled to said input means for converting the position of all of the pulses received during each sample period into amplitude modulated pulses;

(c) first storage means coupled to said demodulating means for storing during any one sample period the voltage of only one of said amplitude modulated pulses;

(d) first gating means coupled to said demodulating means and said first storage means for always coupling the first amplitude modulated pulse occurring during said one sample period to said first storage means for storage therein;

(e) second storage means coupled to said first storage means for storing the amplitude of the pulse selected during the sample period immediately previous to said one sample period;

(f) comparing means coupled to said demodulating means and said first and second storage means for independently comparing the amplitude of the second amplitude modulated pulse occurring during said one sample period and the amplitude of said first pulse stored in said first storage circuit with the amplitude of said previously selected pulse stored in said second storage means;

(g) said first gating means being also coupled to said comparing means for coupling the one pulse of said first and second pulses which is closer in amplitude to the amplitude of said previously selected pulse, whereby said first storage means will be charged to the amplitude of said coupled pulse;

(h) second gating means for coupling said coupled pulse to said second storage means at the end of said sample period, whereby said storage means will be charged to the amplitude of said coupled pulse; and (i) output means for coupling the amplitudes stored in said second storage means to the output circuits of said pulse selecting system.

References Cited

UNITED STATES PATENTS 3,158,759 11/1964 Jasper _____ 328—151 XR
3,212,014 10/1965 Wiggins et al. ____ 325—473 XR JOHN W. CALDWELL, *Primary Examiner.*

DONALD J. YUSKO, *Examiner.*